(12) United States Patent
Lauder

(10) Patent No.: US 6,837,643 B2
(45) Date of Patent: Jan. 4, 2005

(54) ROD COUPLING

(76) Inventor: Arthur W. Lauder, 6808 - 22 Avenue, Edmonton, Alberta (CA), T6K 2H6

( * ) Notice: Subject to any disclaimer, the term of this patent is extended or adjusted under 35 U.S.C. 154(b) by 281 days.

(21) Appl. No.: 09/769,405

(22) Filed: Jan. 26, 2001

(65) Prior Publication Data

US 2002/0102128 A1 Aug. 1, 2002

(51) Int. Cl.$^7$ ................................................ B25G 3/00
(52) U.S. Cl. ........................ 403/305; 166/241.2; 285/45
(58) Field of Search ................................ 403/300, 301, 403/302, 305, 307, 309, 310, 265, 266, 267, 268; 166/241.2, 241.4; 285/45, 55, 296.1; 264/273; 439/936

(56) References Cited

U.S. PATENT DOCUMENTS

| | | | | |
|---|---|---|---|---|
| 89,373 | A | * | 4/1869 | Abbott ........................ 285/329 |
| 272,033 | A | * | 2/1883 | Edge ........................... 264/162 |
| 319,144 | A | | 6/1885 | Stephens et al. |
| 425,071 | A | * | 4/1890 | Greene ........................ 403/268 |
| 1,134,092 | A | | 4/1915 | Bahr |
| 1,703,232 | A | | 2/1929 | Gray et al. |
| 2,016,905 | A | | 10/1935 | Nathan et al. |
| 2,071,921 | A | * | 2/1937 | Dickson ...................... 428/139 |
| 2,224,145 | A | * | 12/1940 | Dugan et al. ............. 219/85.22 |
| 2,337,711 | A | | 12/1943 | Crake |
| 2,646,822 | A | | 7/1953 | Ferguson |
| 2,656,857 | A | | 10/1953 | Cavallier |
| 2,690,934 | A | * | 10/1954 | Holcombe ............... 166/241.2 |
| 2,739,018 | A | | 3/1956 | Collett |
| 2,770,864 | A | * | 11/1956 | Weese ........................ 264/273 |
| 3,091,176 | A | * | 5/1963 | Wall ........................... 101/395 |
| 3,434,900 | A | | 3/1969 | Bender |
| 3,462,175 | A | | 8/1969 | Johnson |
| 3,675,950 | A | | 7/1972 | Beene |
| 3,942,824 | A | | 3/1976 | Sable |
| 3,950,017 | A | * | 4/1976 | Beurer ...................... 285/124.3 |
| 4,168,393 | A | * | 9/1979 | Silva ........................... 174/73.1 |
| 4,205,926 | A | | 6/1980 | Carlson |
| 4,226,550 | A | | 10/1980 | Kupcak et al. |
| 4,484,833 | A | | 11/1984 | Gallagher, Jr. |
| 4,602,807 | A | | 7/1986 | Bowers |
| 4,653,953 | A | * | 3/1987 | Anderson et al. ........... 403/265 |
| 4,668,117 | A | * | 5/1987 | Bair ........................... 166/176 |
| 5,057,263 | A | * | 10/1991 | Bengtsson .................. 264/249 |
| 5,069,485 | A | * | 12/1991 | Allen et al. ............. 285/288.8 |
| 5,248,080 | A | * | 9/1993 | Stapleton .................... 228/175 |
| 5,660,492 | A | * | 8/1997 | Bathon ....................... 403/267 |
| 5,958,315 | A | * | 9/1999 | Fatato et al. ............... 264/46.6 |

FOREIGN PATENT DOCUMENTS

| | | | | |
|---|---|---|---|---|
| CA | 1237907 | | 6/1988 | |
| JP | 5-38768 | * | 2/1993 | ............ B29D/9/00 |

OTHER PUBLICATIONS

German Patent No. 916942, issued Aug. 23, 1954. Applicant does not have a translation of the patent, and requests that the Examiner consider the drawings of the patent.

Italian Patent No. 324499, issued Apr. 1936. Applicant does not have a translation of the patent, and requests that the Examiner consider the drawings of the patent.

* cited by examiner

Primary Examiner—William L. Miller

(57) ABSTRACT

A rod coupling formed of a tubular housing having a first box end and a second box end. The tubular housing has an interior surface defining a bore extending along the tubular housing from the first box end to the second box end, and has an exterior surface. Plural openings extending transversely through the housing from the interior surface to the exterior surface. A coating on the exterior surface of the tubular housing covers the plural openings, and may fill the openings or extend through the openings to form knobs inside the tubular housing. The coatings may taper from the exterior surface towards the interior surface. The openings are preferably distributed uniformly around the tubular housing. The openings are preferably distributed in plural rows. A rod string may be made up of plural such rod couplings and connecting rods.

12 Claims, 1 Drawing Sheet

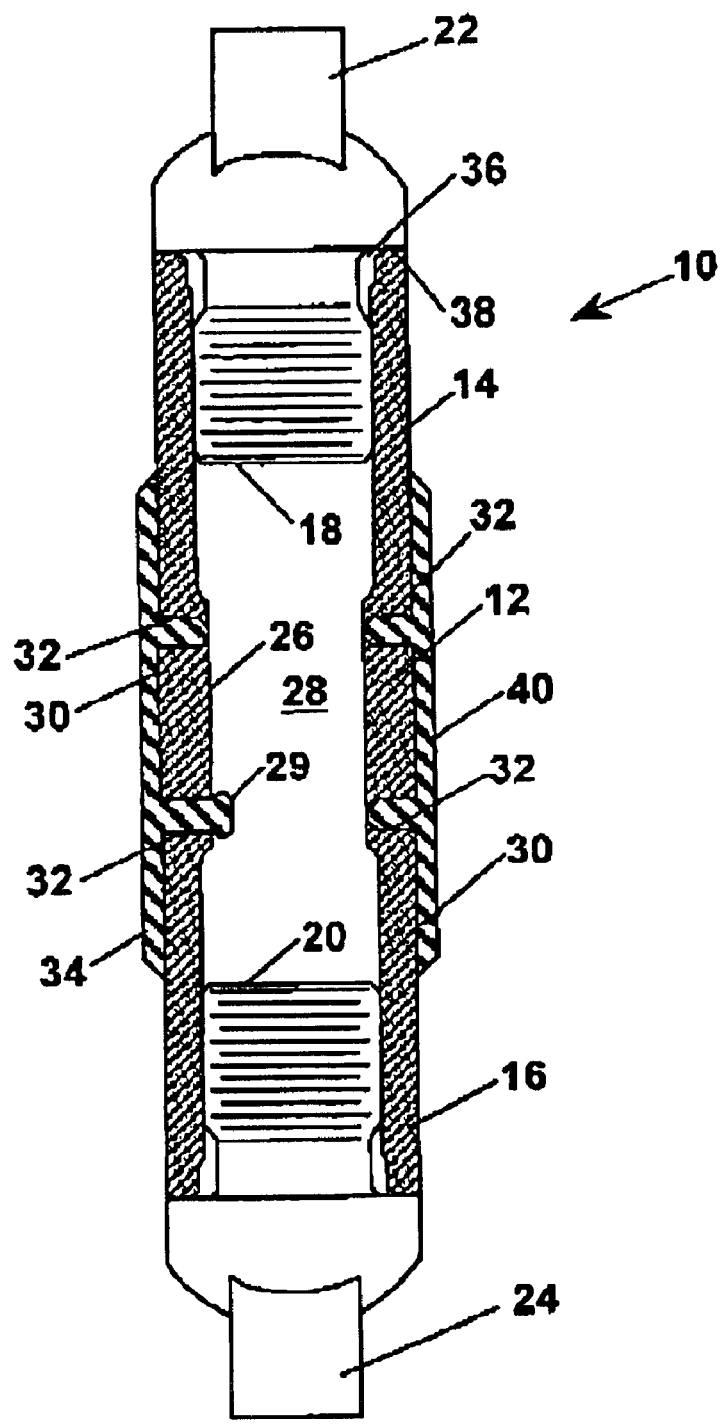
FIGURE

ROD COUPLING

FIELD OF THE INVENTION

This invention relates to rod couplings used to connect rods in a downhole rod string.

BACKGROUND OF THE INVENTION

Rod couplings are used to connect rods in downhole rod strings. The rods may be used for a variety of purposes, for example operating downhole pumps for pumping hydrocarbons to the surface. The rod couplings are usually wider than the rods, and since they typically reciprocate and/or rotate in the well, tend to wear against the casing or other material defining the well bore causing early failure of the casing, tubing or rod string. For this purpose, the rod couplings are usually coated with a rubber, urethane or elastomeric coating that prevents premature wear of the rod coupling. A difficulty arises in that the coating may be easily displaced on the rod coupling, thus ending its effectiveness, and causing the risk of the coating coming off the rod string and fouling equipment in the well. Knurling of the exterior surface of the rod coupling has been used to assist in adhering the coating to the rod coupling, and this helps to hold the coating on the rod coupling.

This invention is directed towards further securing the coating on a rod coupling. With the present invention, even if the coating wears through, it is less likely to detach from the rod coupling.

SUMMARY OF THE INVENTION

There is thus provided a rod coupling formed of a tubular housing having a first box end and a second box end. The tubular housing has an interior surface defining a bore extending along the tubular housing from the first box end to the second box end, and has an exterior surface. Plural openings extend transversely through the housing from the interior surface to the exterior surface. A coating on the exterior surface of the tubular housing covers the plural openings, and may fill the openings or extend through the openings to form knobs inside the tubular housing. The coatings may taper from the exterior surface towards the interior surface. The openings are preferably distributed uniformly around the tubular housing. The openings are preferably distributed in plural rows. A rod string may be made up of plural such rod couplings and connecting rods.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which the sole FIGURE shows a rod coupling in a rod string according to the invention.

DETAILED DESCRIPTION OF PREFERRED EMBODIMENTS

In this patent document, the word "comprising" is used in its non-limiting sense to mean that items following the word in the sentence are included and that items not specifically mentioned are not excluded. The use of the indefinite article "a" in the claims before an element means that one of the elements is specified, but does not specifically exclude others of the elements being present, unless, unless the context clearly requires that there be one and only one of the elements.

Referring to the FIGURE, there is shown a rod coupling 10 formed of a tubular housing 12 having a first box end 14 and a second box end 16. Each box end 14, 16 is threaded for receiving a corresponding pin 18, 20 of respective sucker rods 22, 24. Boxes and pins of sucker rods are well known in the art. The tubular housing 12 has an interior surface 26 defining a bore 28 extending along the tubular housing 12 from the first box end 14 to the second box end 16. The tubular housing 12 also has an exterior surface 30. Plural openings 32 extend transversely through the tubular housing 12 from the interior surface 26 to the exterior surface 30. The openings 32 may be provided in plural rows and are preferably distributed uniformly around the housing 12, for example at 120° spacing. The openings 32 should not be so numerous as to weaken the rod coupling 10 unduly. The rods 22, 24 and tubular housing 12 are made of conventional materials for the intended purpose.

A coating 34 is provided on the exterior surface 30 of the tubular housing 12. The coating 34 covers and may partially occupy or fill the plural openings 32. The coating 34 may be made of any conventional material used for coating a rod coupling, such as urethane, rubber or other elastomers. The coating 34 may be hot applied or adhered to the exterior surface 30, which is preferably knurled to promote adhesion.

The openings 32 may taper from the exterior surface 30 towards the interior surface 26 for example in a stepped pattern, in which the diameter of the openings 32 is significantly reduced adjacent the interior surface 26. This helps prevent coating material from extruding into the bore 28 of the tubular housing 12 if that is desired.

The openings may also be straight through (without a step) or even threaded to promote good adhesion of the coating to the coupling. The coating may also be allowed to extrude into the bore to form a knob as shown at 29 that is larger than the hole and prevent the coating from pulling out.

The tubular housing 12 is made by preparing a tubular housing in conventional manner, except the openings are bored through the tubular housing before the coating is applied.

In operation, the tubing string is made up by threading rods such as rods 22, 24 into the box ends of the rod coupling 12. The threads of the rods are typically lubricated and in addition a metal seal is typically made between a shoulder 36 on the rods 22, 24 and an end face 38 on the tubular housing 12. This seals the bore 28. When the rod string thus made is placed downhole, differential pressure between the exterior 40 of the coating 34 and the bore 28 helps to hold the coating on the rod coupling.

A person skilled in the art could make immaterial modifications to the invention described in this patent document without departing from the essence of the invention that is intended to be covered by the scope of the claims that follow.

What is claimed is:

1. A rod coupling, comprising:
   a tubular housing having a first end adapted for threaded connection to a rod in a downhole rod string and a second end adapted for threaded connection to a rod in a downhole rod string, the tubular housing having an interior surface defining a hollow bore extending along the tubular housing from the first end to the second end, the tubular housing having an exterior surface;

plural openings extending transversely through the housing from the interior surface to the exterior surface; and a coating on the exterior surface of the tubular housing and covering the plural openings, whereby in operation downhole, differential pressure between downhole pressure and pressure in the hollow bore assists in securing the wear coating on the tubular housing.

2. The rod coupling of claim 1 in which the coating extends into the openings.

3. The rod coupling of claim 1 in which the coating extends through the openings to form knobs inside the tubular housing.

4. The rod coupling of claim 1 in which the openings taper from the exterior surface towards the interior surface.

5. The rod coupling of claim 1 in which the openings are distributed uniformly around the tubular housing.

6. The rod coupling of claim 1 in which the openings are distributed in plural rows.

7. A rod siring formed of plural rods connected by plural rod couplings, each rod coupling comprising:

a tubular housing having a first end adapted for threaded connection to a rod in a downhole rod string and a second end adapted for threaded connection to a rod in a downhole rod string, the tubular housing having an interior surface defining a hollow bore extending along the tubular housing from the first end to the second end, the tubular housing having an exterior surface;

plural openings extending transversely through the housing from the interior surface to the exterior surface; and a coating on the exterior surface of the tubular housing and covering the plural openings, whereby in operation downhole, differential pressure between downhole pressure and pressure in the hollow bore assists in securing the wear coating on the tubular housing.

8. The rod string of claim 7 in which the openings taper from the exterior surface towards the interior surface.

9. The rod string of claim 7 in which the openings are distributed uniformly around the tubular housing.

10. The rod string of claim 7 in which the openings are distributed in plural rows.

11. The rod string of claim 7 in which the coating extends into the openings.

12. The rod string of claim 7 in which the coating extends through the openings to form knobs inside the tubular housing.

* * * * *